June 6, 1967 E. LARSSON 3,324,228
HOUSING FOR ELECTRICAL APPARATUS HAVING AN
ELECTRICAL CABLE CONNECTED THEREWITH
Filed Nov. 23, 1966 2 Sheets-Sheet 1

June 6, 1967   E. LARSSON   3,324,228
HOUSING FOR ELECTRICAL APPARATUS HAVING AN
ELECTRICAL CABLE CONNECTED THEREWITH
Filed Nov. 23, 1966   2 Sheets-Sheet 2

Eskil Larsson,
Inventor

By, Wenderoth, Lind and Ponack
Attorneys 3,324,228
HOUSING FOR ELECTRICAL APPARATUS HAVING AN ELECTRICAL CABLE CONNECTED THEREWITH
Eskil Larsson, Gnosjohus, Gnosjo, Sweden
Filed Nov. 23, 1966, Ser. No. 596,640
6 Claims. (Cl. 174—65)

This application is a continuation-in-part of application Ser. No. 371,340, filed June 1, 1964 and entitled, "Adaptors for Electric Cables."

This application relates to a housing for electrical apparatus having an electrical cable connected therewith. More particularly the application relates to such housing with an electrical cable having insulated conductors encased by a composite sheathing composed of an inner metal sheath and an outer plastic tube.

Hitherto the cable has been sealingly connected to the housing by screw connectors comprising several parts, viz. an outer and an inner sleeve, two pressure rings and a rubber packing. Apart from being inconvenient to assemble and expensive to manufacture on account of the several different parts included therein the known connectors of the type referred to above are objective since the pressure of the rubber packing to be placed around the plastic tube eventually produces a restriction of such tube. When the temperature of the cable rises e.g. by heat generated when the cable is electrically loaded, the pressure of the rubber packing against the plastic tube will increase, and when the cable then cools off a waist will form in the outer surface of the plastic tube opposite the rubber packing. Thereby, the connector will fail to maintain the necessary seal between the cable and the housing and will allow moisture and water to penetrate past the packing and to enter the interior of the housing. This will cause flash-over and short-circuiting in the cable and/or the electrical apparatus encased by the housing resulting in serious damages and long breakdowns. These risks are especially great when the cable is connected to the housing on the upper side thereof in out-door installations, mines or moist locations.

An object of the present invention is to eliminate the drawbacks recited above and to provide a connection between an electrical cable and a housing for an electrical apparatus which is very simple and which may be produced at low cost.

Another object is to provide a connection of the type referred to which enables the mounting of the cable to the housing to be made with the use of simple tools.

A further object is to provide a connection of the type referred to which has superior sealing characteristics and eliminates objective pressure on the conductors in the cable and on the plastic tube forming part of the cable sheathing.

A still further object is to provide a connection of the type referred to which prevents the cable to be inadvertently torn off the housing and thereby is suitable for use in localities in which there may be a risk for explosion.

These and other objects are achieved according to the invention by providing in combination with a housing enclosing electrical apparatus and forming at least one lead-through opening for an electrical connection to such apparatus, and an electrical cable having insulated conductors encased by a composite sheathing composed of an inner metal sheath and an outer plastic tube, a tubular adaptor including at one end thereof an outwardly threaded cylindrical end portion secured by threaded engagement to said housing with said end portion inserted into said opening, a terminal portion of said metal sheath extending through said adaptor, and at its other end an insert end portion conically tapering towards the end of said adaptor opposite said threaded cylindrical end portion thereof, said plastic tube being removed from part of said terminal portion of said metal sheath to extend over the length of said insert end portion only which is inserted between said plastic tube and said metal sheath, said conductors projecting from said metal tube inside said housing and being connected to said electrical apparatus.

The invention now will be described in further detail with reference to the drawing illustrating several exemplary embodiments thereof.

Figure 1:
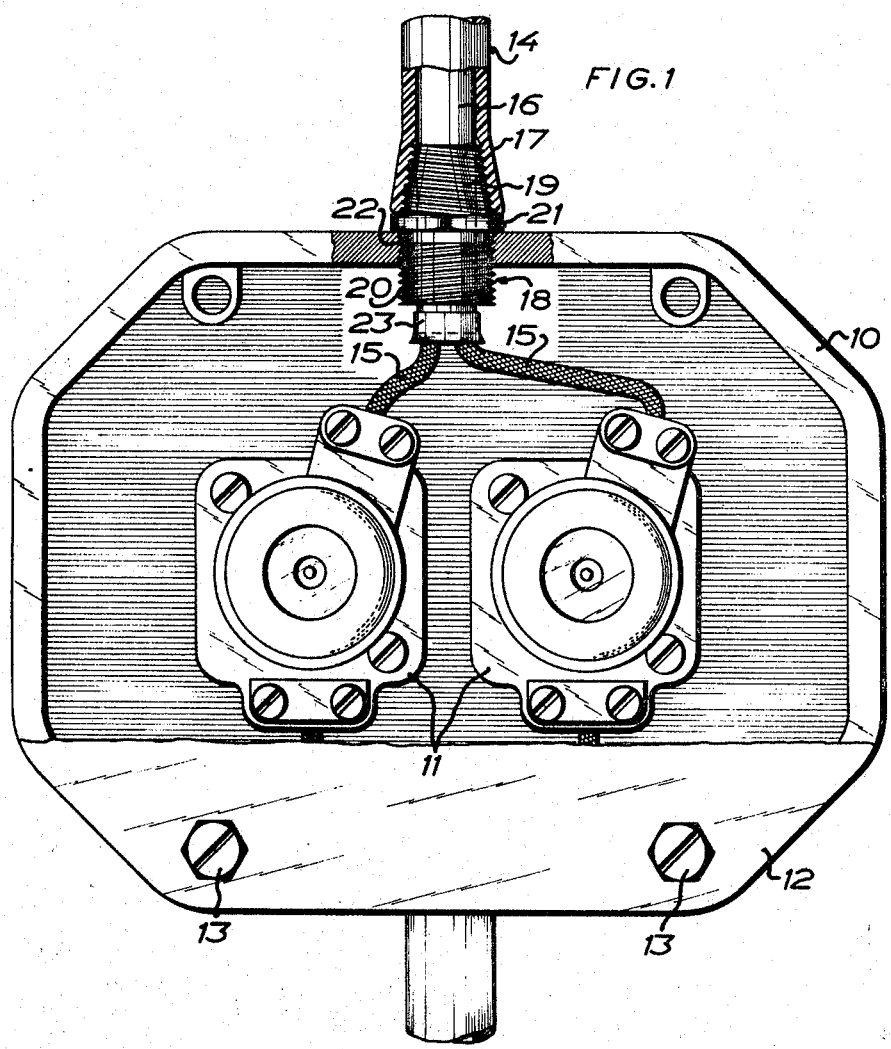
FIG. 1 is an elevational view, partly in vertical section, of a housing enclosing an electrical apparatus and having a cable connected thereto, parts of a cover on said housing being broken away to show the interior of the housing.

With reference to the drawing and especially to FIG. 1 therein a housing 10 formed by a metal casting encloses an electrical apparatus 11 shown as two conventional fuses. Such apparatus may comprise any known electrical apparatus commonly encased by a housing in terminal or distributing arrangements, such as switches, circuit breakers, cut outs, contactors and the like. The housing is closed by a removable cover 12, only fragmentarily shown, which is connected to the housing by screws 13.

Connected to the housing is an electrical cable 14 of known type comprising two insulated conductors 15 surrounded by a composite sheathing comprising an inner metal sheath 16 and an outer plastic tube 17. The inner metal sheath 16 is shown as a metal tube but in other cables such metal sheath may comprise a metal braid or other metal screen. According to the invention cable 14 is connected to housing 10 by a tubular adaptor 18 formed as a unitary single piece of brass, plastic or other suitable material. It comprises a conically tapering end portion 19, a cylindrical end portion 20 and an intermediate hexagonal portion 21. The conically tapering end portion 19 of adaptor 18 has left-hand threads while cylindrical end portion 20 is provided in the customary manner with right-hand threads. Adaptor 18 is connected to housing 10 by having cylindrical end portion 20 threadedly engaging internal threads in a lead-through opening 22 in housing 10. Metal tube 16 of cable 14 extends with a terminal portion through adaptor 18, plastic tube 17 being removed from the cable over part of metal tube 16 to enable said terminal portion to be inserted through the adaptor. However, plastic tube 17 extends over conically tapering end portion 19, said latter portion being inserted between said plastic tube and said metal tube. When adaptor 18 is tightened in casing 10 by means of a wrench or like tool engaging hexagonal portion 21 insert end portion 19 will simultaneously be screwed in under plastic tube 17 to provide a complete seal.

For facilitating the mounting and counteracting damages on the plastic tube the threads of the conically tapering portion preferably have rounded crests.

Inside housing 10 conductors 15 extending from the end portion of metal tube 16 terminating in the interior of housing 10 are connected in the conventional manner to fuses 11 mounted in the housing. An insulating strip 23 is wound around the end of metal tube 16 and conductors 15 projecting therefrom, in order to form a closure of the metal tube.

As a modification, cylindrical end portion 20 may be inserted through lead-through opening 22 without being threadingly engaged by internal threads therein, a nut being provided on said portion and being tightened against the inner surface of housing 10.

Figure 2:
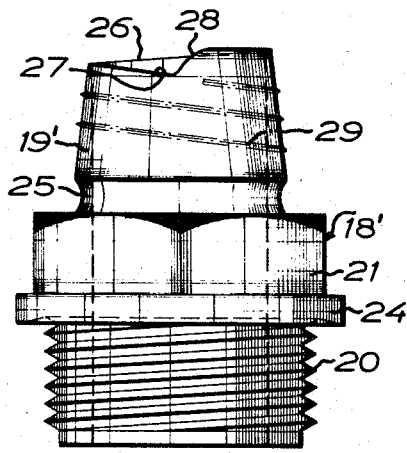
FIG. 2 is an enlarged elevational view of an adaptor of a modified construction according to the invention.

The adaptor shown in FIG. 2 and generally designated 18′ is preferably made of a plastic material such as nylon. In this case there is provided between hexagonal portion 21 and cylindrical right-hand threaded end portion 20 a cylindrical portion 24 of small axial length, such portion forming a collar on the adaptor and being adapted to sealingly engage the outer surface of housing 10 when the adaptor is connected to said housing. Preferably, collar 24 forms an annular depression on the side thereof facing cylindrical portion 20, such depression having a depth increasing successively from the periphery of said collar. When engaged with the outer surface of the housing said collar is deformed to planar form, the seal afforded by the collar thereby being improved.

The adaptor according to FIG. 2 further differs from that according to FIG. 1 by having a conically tapering insert end portion 19′ without threads scuh portion being separated from hexagonal portion 21 by a groove 25. Portion 19′ forms a relatively sharp edge 26 having a notch 27 therein. Thereby, portion 19′ forms a tongue 28 which cuts in between metal sheath 16 and plastic tube 17 when adaptor 18′ and cable 14 are relatively rotated one or two turns with the terminal portion of inner sheath 16 from which plastic tube 17 is removed inserted into the adaptor and with edge 26 engaging the cable. Thus, there is provided a groove between layers 16 and 17 guiding the conically tapering end portion 19′ when the cable is pressed axially against the adaptor with plastic tube 17 sliding over said portion. When the end surface of plastic tube 17 engages hexagonal portion 21 said tube is deflected into groove 25 thus affording an improved seal around the adaptor.

It is appreciated that in the embodiment shown in FIG. 2 there may be provided a right-hand thread on conically tapering insert end portion 19′ as indicated in FIG. 2 by phantom lines 29 in order to screw said portion into plastic tube 17.

Figure 3:
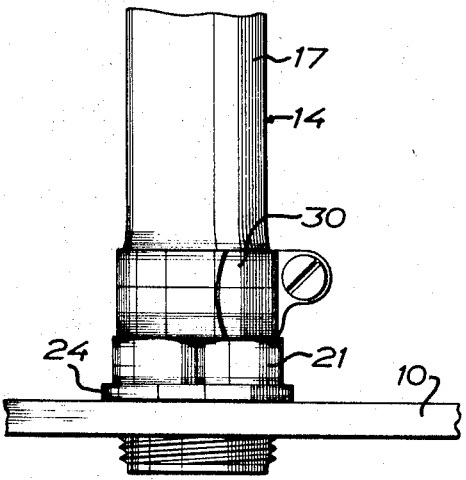
FIG. 3 is an elevational view of a cable connected to a fragmentarily shown housing and having a conventional hose clamp surrounding the plastic tube of the cable opposite the insert end portion of the adaptor inserted in said plastic tube.

For improvement of the seal between plastic tube 17 and conically tapering insert end portion 19 or 19′ there may be provided, as shown in FIG. 3, a hose clip 30 which engages externally the part of plastic tube 17 which extends over said insert portion, close to hexagonal portion 21. Such clip may be of any conventional form e.g. the type comprising a flexible metal strip having a housing at one end with a worm rotatably mounted therein, and forming a rack on one side to engage said worm. The strip has its other end inserted into said housing and thus forms an eye. The worm is in engagement with the rack formed by the strip and by rotating the worm the eye thus formed may be tightened.

The invention is not limited to the embodiments shown and described but may be modified within the scope of the appended claims.

What I claim and desire to secure by Letters Patent is:

1. The combination comprising a housing enclosing electrical apparatus and forming at least one lead-through opening for an electrical connection to such apparatus, an electrical cable having insulated conductors encased by a composite sheathing composed of an inner metal sheath surrounded by an outer plastic tube, and a tubular adapted including at one thereof an outwardly threaded cylindrical end portion secured by thread engagement to said housing with said end portion inserted into said opening, a terminal portion of said metal sheath extending through said adaptor, and at its other end an insert end portion conically tapering towards the end of said adaptor opposite said threaded cylindrical end portion thereof, said plastic tube being removed from part of said terminal portion of said metal sheath to extend over the length of said insert end portion only which is inserted between said plastic tube and said metal sheath, said conductors projecting from said metal sheath inside said housing and being connected to said electrical apparatus.

2. The combination as claimed in claim 1 in which said insert end portion of said adaptor is outwardly threaded oppositely to said threaded cylindrical end portion.

3. The combination as claimed in claim 1 in which the outer edge of said insert end portion is notched to form a tongue facilitating the insertion of said insert end portion between said metal sheath and said plastic tube.

4. The combination as claimed in claim 1 in which said adaptor further comprises an intermediate portion between said end portions, said intermediate portion providing flat surfaces to be engaged by a wrench.

5. The combination as claimed in claim 1 in which said housing is provided with internal threading in said lead-through opening and said externally threaded cylindrical end portion of said adaptor engages such threading.

6. The combination as claimed in claim 1 further comprising a hose clip externally engaging the part of said plastic tube which extends over said insert end portion of said adaptor.

No references cited.

LEWIS H. MYERS, *Primary Examiner.*

D. L. CLAY, *Assistant Examiner.*